United States Patent
MacLennan (10) Patent No.: US 7,930,322 B2
(45) Date of Patent: Apr. 19, 2011

(54) TEXT BASED SCHEMA DISCOVERY AND INFORMATION EXTRACTION

(75) Inventor: C. James MacLennan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 12/127,017

(22) Filed: May 27, 2008

(65) Prior Publication Data

US 2009/0300043 A1    Dec. 3, 2009

(51) Int. Cl.
G06F 7/00 (2006.01)
G06F 17/30 (2006.01)

(52) U.S. Cl. .................... 707/804; 707/811

(58) Field of Classification Search .............. None
See application file for complete search history.

(56) References Cited

U.S. PATENT DOCUMENTS

| | | | |
|---|---|---|---|
| 5,926,811 A * | 7/1999 | Miller et al. ............. 707/748 |
| 6,651,055 B1 * | 11/2003 | Kilmer et al. ............. 1/1 |
| 6,738,767 B1 | 5/2004 | Chung et al. |
| 6,990,632 B2 | 1/2006 | Rothchiller et al. |
| 7,072,896 B2 | 7/2006 | Lee et al. |
| 7,251,777 B1 | 7/2007 | Valtchev et al. |
| 7,428,522 B1 * | 9/2008 | Raghunathan ............. 1/1 |
| 2001/0047271 A1 * | 11/2001 | Culbert et al. ............. 705/1 |
| 2002/0169788 A1 * | 11/2002 | Lee et al. ............. 707/104.1 |
| 2003/0033333 A1 * | 2/2003 | Nishino et al. ............. 707/531 |
| 2003/0088562 A1 * | 5/2003 | Dillon et al. ............. 707/5 |
| 2004/0153459 A1 * | 8/2004 | Whitten et al. ............. 707/10 |
| 2004/0260677 A1 * | 12/2004 | Malpani et al. ............. 707/3 |
| 2005/0154690 A1 * | 7/2005 | Nitta et al. ............. 706/46 |
| 2005/0177431 A1 * | 8/2005 | Willis et al. ............. 705/14 |
| 2006/0117057 A1 | 6/2006 | Legault et al. |
| 2006/0155751 A1 * | 7/2006 | Geshwind et al. ............. 707/102 |
| 2006/0218115 A1 * | 9/2006 | Goodman et al. ............. 707/1 |
| 2006/0242180 A1 | 10/2006 | Graf et al. |
| 2007/0011183 A1 | 1/2007 | Langseth et al. |
| 2007/0022093 A1 | 1/2007 | Wyatt et al. |
| 2007/0143320 A1 | 6/2007 | Gaurav et al. |

OTHER PUBLICATIONS

Automatically generating OLAP schemata from conceptual graphical models, Hahn et al, DOLAP'00 11/00 McLean VA, 2000.*
Cafarella, et al., "Navigating Extracted Data with Schema Discovery", Jun. 15, 2007, pp. 1-6.
Gubanov, et al., "Structural Text Search and Comparison Using Automatically Extracted Schema", Jun. 30, 2006, 1-6.
Hegewald, et al., "XStruct: Efficient Schema Extraction from Multiple and Large XML Documents", IEEE, 2006, pp. 1-10.
Lise Getoor, "Structure Discovery using Statistical Relational Learning", IEEE, 2003, pp. 1-8.

* cited by examiner

Primary Examiner — Pierre M Vital
Assistant Examiner — Augustine Obisesan (57) ABSTRACT

Various technologies and techniques are disclosed for text based schema discovery and information extraction. Documents are analyzed to identify sections of the documents and a relationship between the sections. Statistics are stored regarding occurrences of items in the documents. A probabilistic model is generated based on the stored statistics. A database schema is generated with a plurality of tables based upon the probabilistic model. The documents are analyzed against the probabilistic model to determine how the documents map to the tables generated from the database schema. The tables are populated from the documents based on a result of the analysis against the probabilistic model.

14 Claims, 7 Drawing Sheets

TEXT BASED SCHEMA DISCOVERY AND INFORMATION EXTRACTION

BACKGROUND

Computer users often input data into a computer that gets stored in a structured format. Many software applications store data in a structured format. Structured data gets is usually stored in various fields and tables in a database in ways that enable analysis, reporting, and examination of the data in various ways. Unstructured data is commonly created by users as well, such as documents and other information that allow the user to type information in a free-form fashion. A word processing document is an example of a typical unstructured data format that many users create. The document can contain various sections that the user defines, in no particular order, and with no particular consistency between different documents.

Analyzing information contained in unstructured documents in a meaningful way can be quite a complex task for organizations. For example, if hundreds of documents are on a user's computer or file server, it is quite difficult for the user to run a report against those documents to analyze the content of the documents in more meaningful ways.

SUMMARY

Various technologies and techniques are disclosed for text based schema discovery and information extraction. A database schema is created from unstructured documents. A document is accessed, and information is extracted from the document using text mining. The extracted information is analyzed to identify sections of the document. Statistics are stored regarding an occurrence of items in the document. The accessing, extracting, analyzing, and storing steps are repeated for a plurality of documents. A probabilistic model is created based on the stored statistics. A database schema is then created using the probabilistic model.

In another implementation, a method is described for mapping information extracted from a document to database tables according to a probabilistic model. A document is accessed, and information is extracted from the document using text mining. The extracted information is analyzed against a probabilistic model to determine how the extracted information maps to tables in a database. The tables are populated with one or more portions of the extracted information based upon a result of the analyzing step. Further analysis can then be performed against the data in the tables once the tables are populated.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that programmatically discovers schemas from text based documents and imports information from the documents according to the schemas, but the technologies and techniques also serve other purposes in addition to these. In one implementation, one or more of the techniques described herein can be implemented as features within a database program such as MICROSOFT® SQL Server, or from any other type of program or service that manages data from various sources.

In one implementation, a database schema is automatically created from analyzing various details contained in unstructured text documents. A database utilizing the database schema is then populated based upon the analysis of the unstructured text documents. Once in the database, an end user can then analyze the data in various ways, such as by utilizing online analytical processing (OLAP) cubes, running reports against the data, using data mining or other techniques to better understand the data. Thus, various documents that were once stored in an unstructured text format can now be analyzed in more meaningful ways as a group, and also individually.

Figure 1:
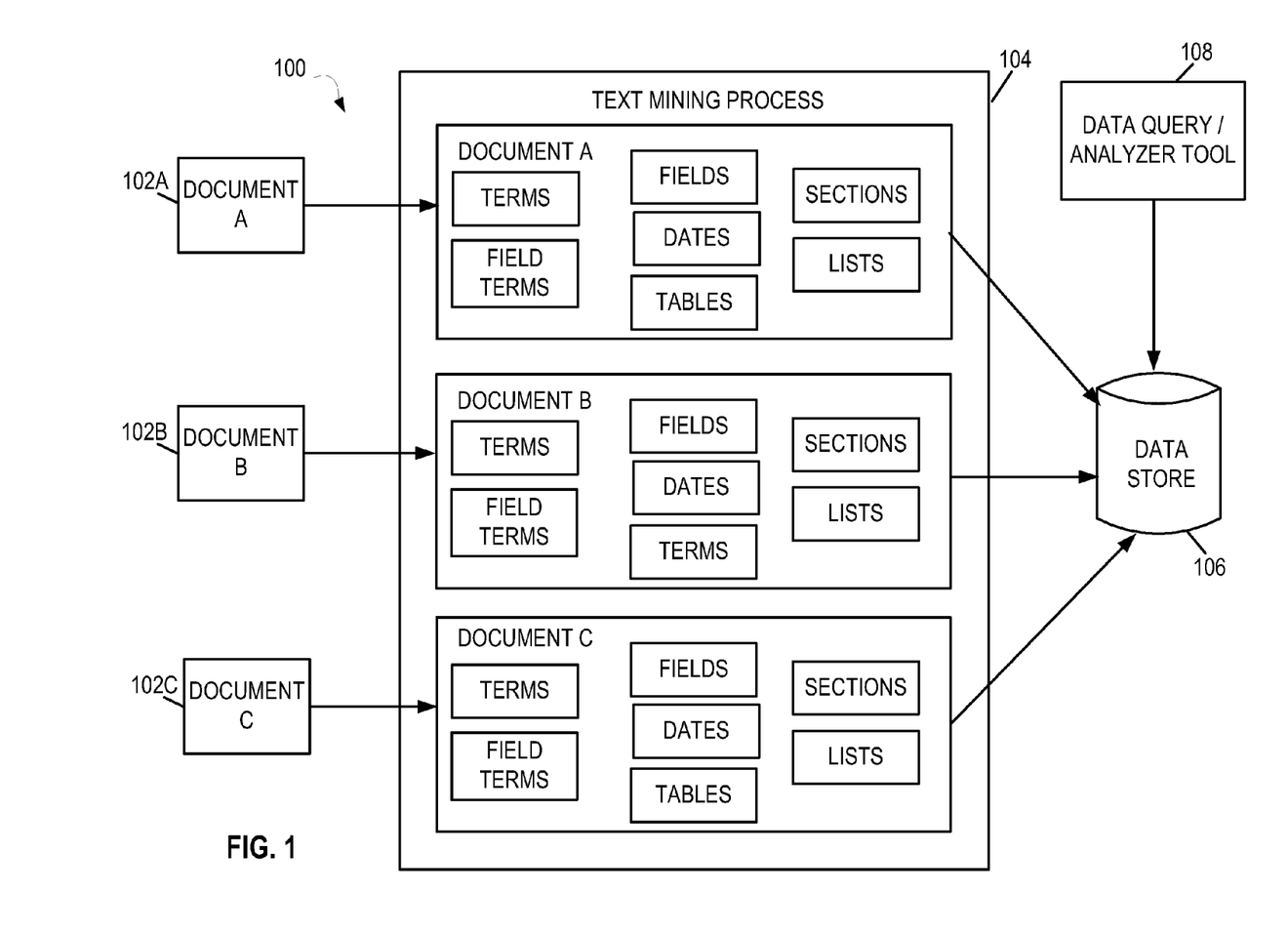
FIG. 1 is a diagrammatic view of a text based schema discovery and extraction system of one implementation.

FIG. 1 is a diagrammatic view of a text based schema discovery and extraction system 100 of one implementation. Multiple types of data are inferred from existing documents based on the documents structure and content through the application of machine learning techniques generally available to database platforms. Through a text mining process 104 that analyzes a corpus of similar documents, a structure of the documents is inferred. This structure is then used to generate a database schema, and a data store 106 following that database schema is then populated with the data from the unstructured documents. One or more data query/analyzer tool(s) 108 can then be used to perform interesting analysis of the data.

To infer the database schema, a corpus of similar documents is analyzed. In the example shown in FIG. 1, this would be document A (102A), document B (102B), and document C (102C). The documents can be analyzed to determine their terms, field terms, fields, dates, tables, sections, lists, and/or other component parts. Terms can be identified using existing text mining techniques. In one implementation, term dictionaries are generated along with a transaction table of term/document, but additional text mining techniques can also be applied. For example, sentiment analysis can be applied to record the number of positive vs. negative statements. Typical complexity analysis currently available in word processing programs such as word count, grade level, etc, can be stored as well.

In one implementation, field data is generally inferred by location, format, and labels that are common throughout a corpus. Some examples of field data are: Title, Address (and parts thereof), ID, Date, Author, or Recipient. In one implementation, section data is inferred by document structure, format, and repetition throughout documents. For example, upon analyzing a set of patent documents such as this one, system 100 could infer a Background, Abstract, and Detailed Description section. From section data, system 100 could infer section existence, section title, section text, section terms, and/or section items (terms that appear in fields in other documents).

In one implementation, items like section terms and list data (explained in more detail later) create additional transactional tables in the schema.

In one implementation, terms that appear in free text and are field values are separated into their own tables relating the field to the document and potentially the section that the term appears. This allows queries for documents referring to specific field values.

Dates have special analytical properties can be stored in a separate table similar to that of field terms, allowing for queries that find all documents referring to events within a date range. List data generally appears in a section and contains repetitive parts such as previous occupations in resumes or quoted references in essays or technical documents. Lists can generally be inferred by format or structure (e.g. a repetitive series of items on separate adjacent lines or bulleted or numbered text items).

Occasionally, lists can be found without a clear demarcation or fields. For example, some lists are non-demarcated free text. In this case, system 100 would determine if "Approach" sections in multiple documents commonly had non-demarcated free text lists and impute that such a list is an object. In this case, the "Approach" list table would contain the item title, free text, plus additional tables for terms, etc.

In scenarios where the documents contain similarly labeled and structured tables, than system 100 can incorporate the descriptions of those tables into the database schema.

An overall database schema can then be inferred from these various techniques introduced herein. For example, analysis of a corpus of resumes would determine that documents typically have a name, address, phone number, objective, plus lists of educational achievements and previous occupations, each with their own fields. Additionally, appearance of terms in free text areas of a document and field data provides information. When the system encounters the term "Cornell University" in free text, for example, it can determine that the free text concerns an educational institution because "Cornell University" also appears in the "Name" field of an object in the "Education" section. Note that machine learning techniques are generally probabilistic models, therefore such an assertion would have an associated probability of being true. The system may determine that "Cornell University" has a 70% chance of being an educational institution and a 20% chance of being an employer, with the other 10% being simply non-related.

In one implementation, with system 100, a user could determine the trend in applications from individuals with software engineering experience and degrees in non-CS or math fields from Ivy League universities. Furthermore, from that list, the user could find all current employees with resumes on file that previously worked at the same employer during the same time span.

In one implementation, system 100 basically operates in two sections. First, a process (describe in FIGS. 2-3) would be run to create the database schema, and then a process (described in FIG. 4) is run to populate the database tables with the information in the documents. In other implementations, different processes can be used to take advantage of the techniques mentioned herein, and these are just listed for the sake of illustration.

Turning now to FIGS. 2-6, the stages for implementing one or more implementations of text based schema discovery and extraction system 100 are described in further detail. In some implementations, the processes of FIGS. 2-6 are at least partially implemented in the operating logic of computing device 500 (of FIG. 7).

Figure 2:
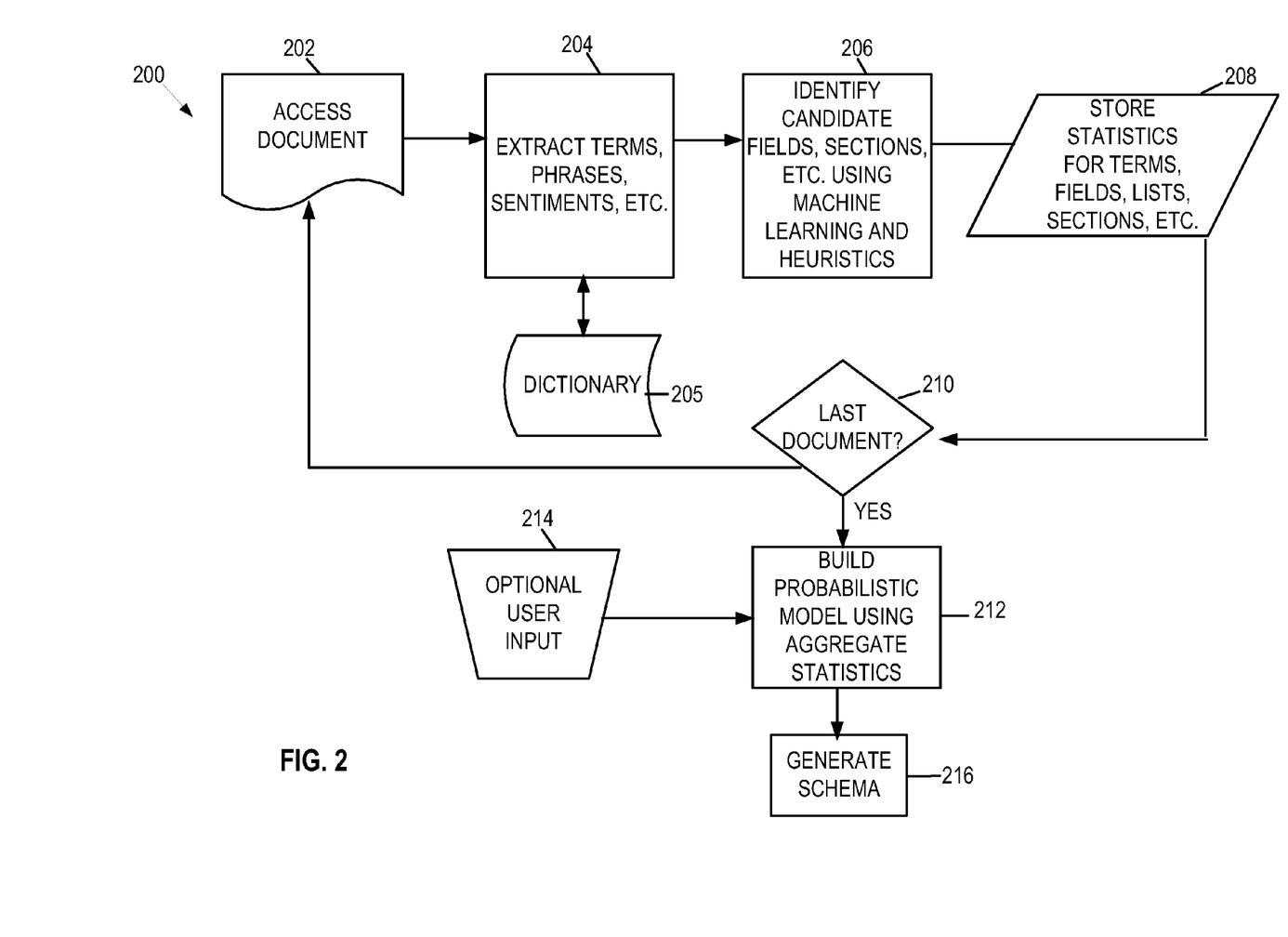
FIG. 2 is a process flow diagram for one implementation illustrating the stages involved in creating a database schema from unstructured documents.

FIG. 2 is a process flow diagram 200 for one implementation illustrating the stages involved in creating a database schema from unstructured documents. A document is accessed programmatically (stage 202). Information is extracted from the document using text mining techniques (stage 204). For example, terms, phrases, sentiments, etc. can be extracted. This was described earlier in FIG. 1. In one implementation, one or more industry-specific dictionaries 205 can be consulted to assist with the text mining (stage 205). The extracted information is analyzed to identify sections of the document (stage 206). For example, fields, sections, etc. can be identified using machine learning and heuristics (stage 206). This was also described in detail in the discussion of FIG. 1. Statistics regarding an occurrence of items in the document are stored (stage 208). For example, statistics are stored regarding the terms, fields, lists, sections, etc. that are contained in the document. The steps are repeated for each of the additional documents (decision point 210) being processed to infer a database schema.

If the document just processed was the last document (decision point 210), then a probabilistic model is generated using aggregated statistics that were gathered and stored from all the documents analyzed (stage 212). The term "probabilistic model" as used herein is meant to include machine learning algorithms that derive probabilistic inferences from data, such as decision trees, clustering, neural networks, Bayesian models, and other techniques. The user can optionally provide input to review and/or approve the probabilistic model (stage 214). The user review process is described in further detail in FIG. 3. A database schema is then generated using the probabilistic model (stage 216). The probabilistic model enables the documents to then be mapped from the source document into the database schema that was just created. The mapping process is described in further detail in FIG. 4.

Figure 3:
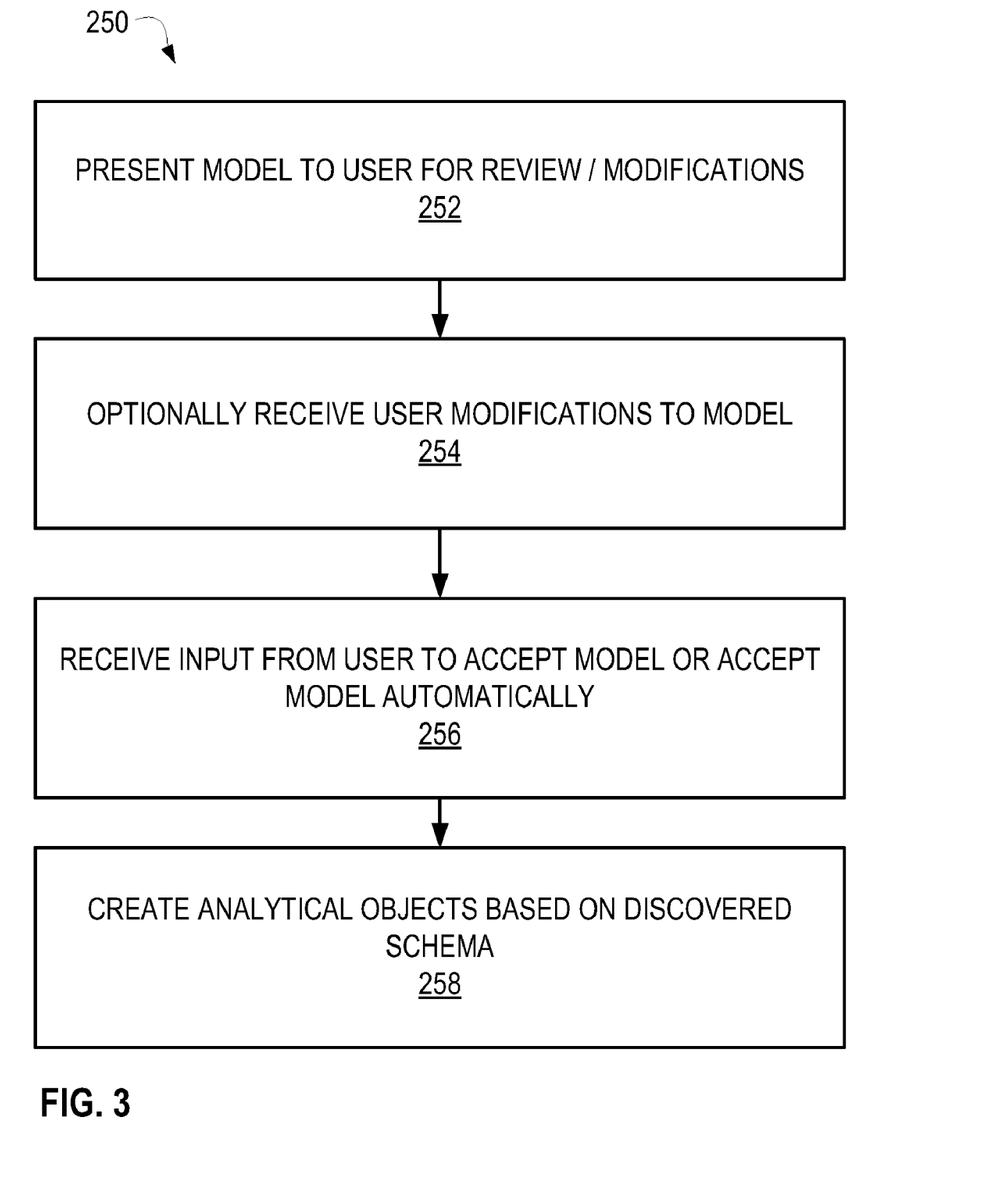
FIG. 3 is a process flow diagram for one implementation illustrating the stages involved in allowing a user to modify the probabilistic model.

FIG. 3 is a process flow diagram 250 for one implementation illustrating the stages involved in allowing a user to modify the probabilistic model. The probabilistic model is presented to the user for review and/or modifications (stage 252). User modifications to the probabilistic model can optionally be received (stage 254). In other words, the user can view the probabilistic model in a meaningful way and make changes if desired. In general, user edits will be deletions rather than additions. For example, if the probabilistic model suggested a "Process" section and the user decides that such a section doesn't really exist, the user can delete the section. There are many options for user interfaces at this point, such as thresholds as to how aggressive the algorithm is in choosing objects. Additional user interface elements could allow the user to collapse multiple terms into a single term given suggestions by fuzzy grouping technology, e.g. "Cornel Universty" becomes "Cornell University."

Input can be received from the user to accept the model, or the model can be accepted automatically (stage 256). Once the probabilistic model is accepted (by the user or automatically), then the structures for the analytical objects are created based upon the discovered schema (stage 258). In one implementation, one or more types of structures for analytical objects are created. For example, an OLAP cube structure can be generated for later use through standard OLAP analysis techniques. The structure of interactive reports with drill-down capability to the source documents can be generated. Such interactive reports can include a document outline of what an average document looks like, field reports, top terms/section, and/or date based reports depending on the schema, to name a few non-limiting examples. The structure of one or more mining models can be created, such as those that include term association by document or section, link analysis, cluster analysis, and/or predictive models. These analytical objects are described in further detail in FIG. 5.

Once the database schema and/or analytical objects are created based upon the probabilistic model, then data can be populated in the database tables from the source documents. The analytical objects can now be populated with the actual data as well.

Figure 4:
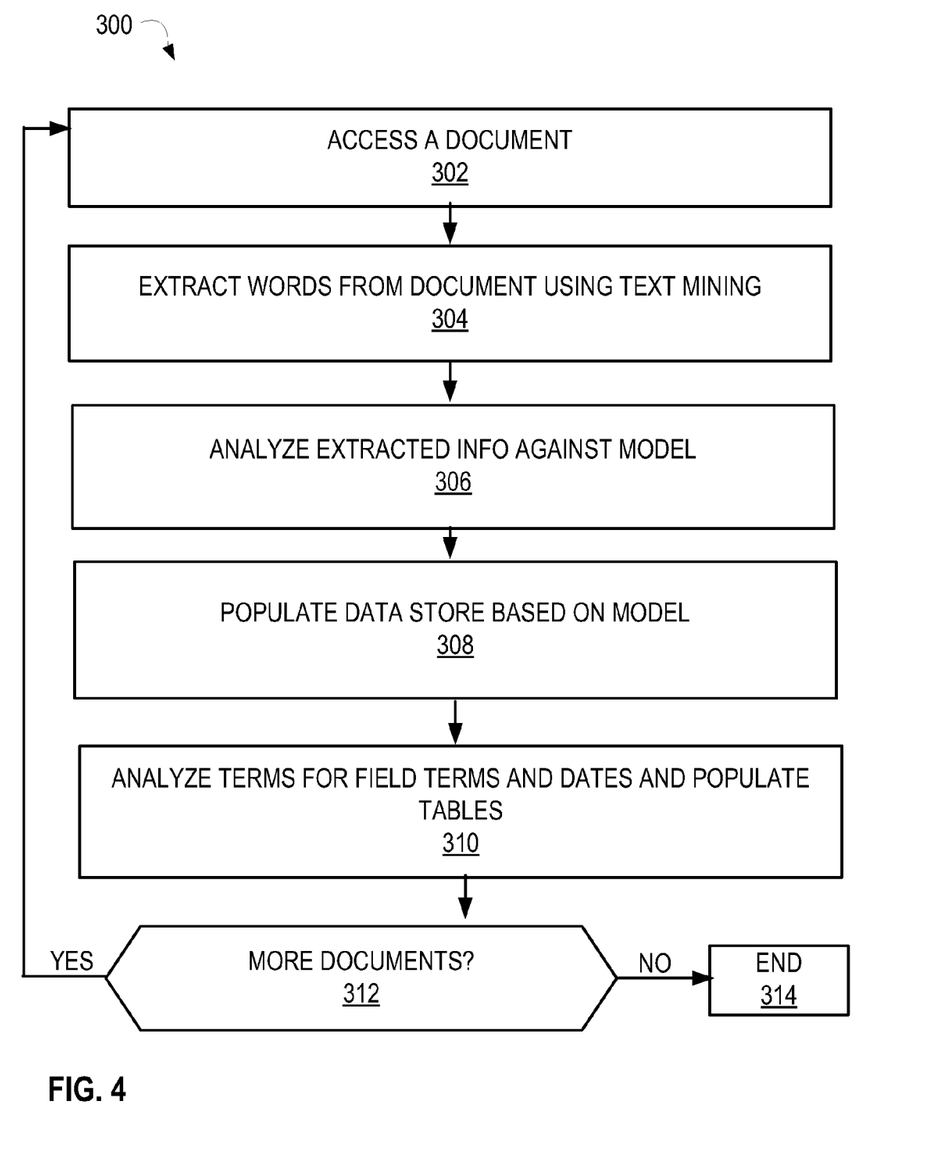
FIG. 4 is a process flow diagram for one implementation illustrating the stages involved in mapping information extracted from a document to database tables according to a probabilistic model.

FIG. 4 is a process flow diagram 300 for one implementation illustrating the stages involved in mapping information extracted from a document to database tables according to the probabilistic model created from the processes of FIGS. 2 and 3. A document is accessed (stage 302), and words are extracted from the document using text mining techniques (stage 304). The extracted information is analyzed against the previously generated probabilistic model (stage 306). The data store (e.g. the database tables) is then populated based on the probabilistic model (stage 308). In other words, the data that was extracted from the document is then placed into the proper tables in the database based upon the mappings. The terms are then analyzed for field terms and dates to populate any additional tables and/or update existing database tables as necessary (stage 310). For example, database cross reference tables can be updated to include additional entries that need to be stored for a given list of options. The process is then repeated for each additional document in the set being processed (decision point 312). If there are no more documents to process (decision point 312), then the process ends (stage 314). In one implementation, the analytical objects that were previously created (or that are now being created) can be populated/processed with the data. As new documents are created, they can be processed through this phase for their information to be added to the database tables.

Figure 5:
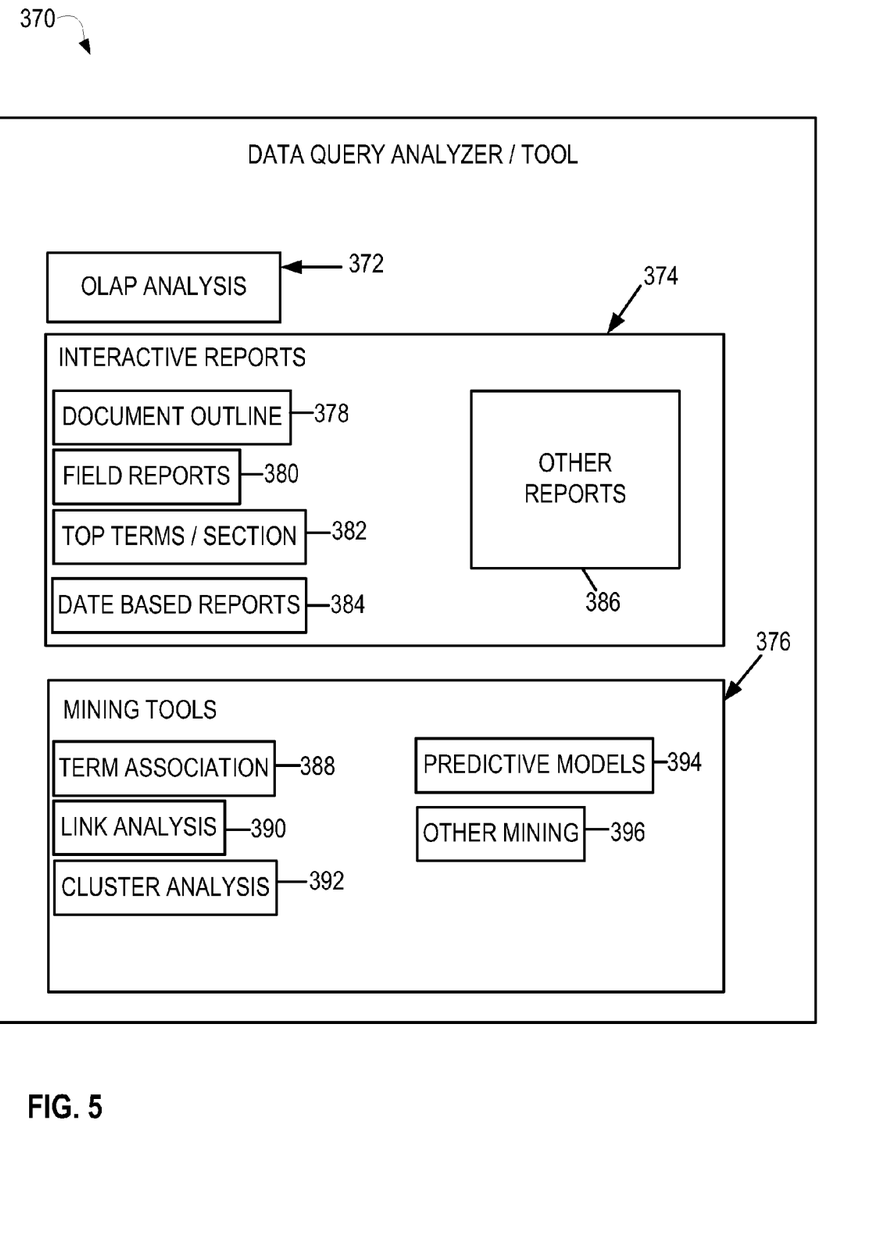
FIG. 5 is a diagrammatic view of a data query analyzer tool for one implementation.

FIG. 5 is a diagrammatic view of a data query analyzer tool 370 for one implementation. Once a database schema has been generated from the documents, and the documents have been mapped to the probabilistic model to populate the database tables and analytical objects, then interesting queries and analyses can be performed across the unstructured data (that was imported). To the extent that OLAP cubes were generated from the documents, then OLAP analysis 372 can be performed against the unstructured documents. Interactive reports 374 can be accessed to analyze the unstructured documents in various ways. A few non-limiting examples include a report showing a document outline 378 of what an average document looks like, field reports 380, top terms/section 382, date based reports 384 depending on the schema, and/or other reports 386. Alternatively or additionally, predictive algorithms 376 can be utilized, such as those that display related terms by document or section 388, link analysis demonstrating cross-referencing of documents 390, cluster analysis performing automatic groupings of documents by a variety of content metrics 392, predictive models to automatically determine the type of document 394, and/or other predictive models 396.

A few practical examples of the aforementioned techniques will now be described for further illustration. Term association 388 can be performed to associate related terms. For example, extending the "Cornell University" example above, the system can find common terms that appear to have multiple behaviors, e.g. how many "Employees" are also "Customers" simply by the way their names are used in context. Link analysis 390 can be performed via contextual, field, or list based relationships. For example, the user can find documents that reference "Cornell University", find a common topic in them (e.g. "Particle Acceleration"), and then link to other research organizations that are partnering with Cornell on Particle Acceleration. An even simpler implementation would be akin to a patent reference graph. Reading a set of patent documents, the references can be diagrammed to find a core set of patents even if those patents are not included in the corpus, because the items in the reference list can be identified as containing document identifiers.

Figure 6:
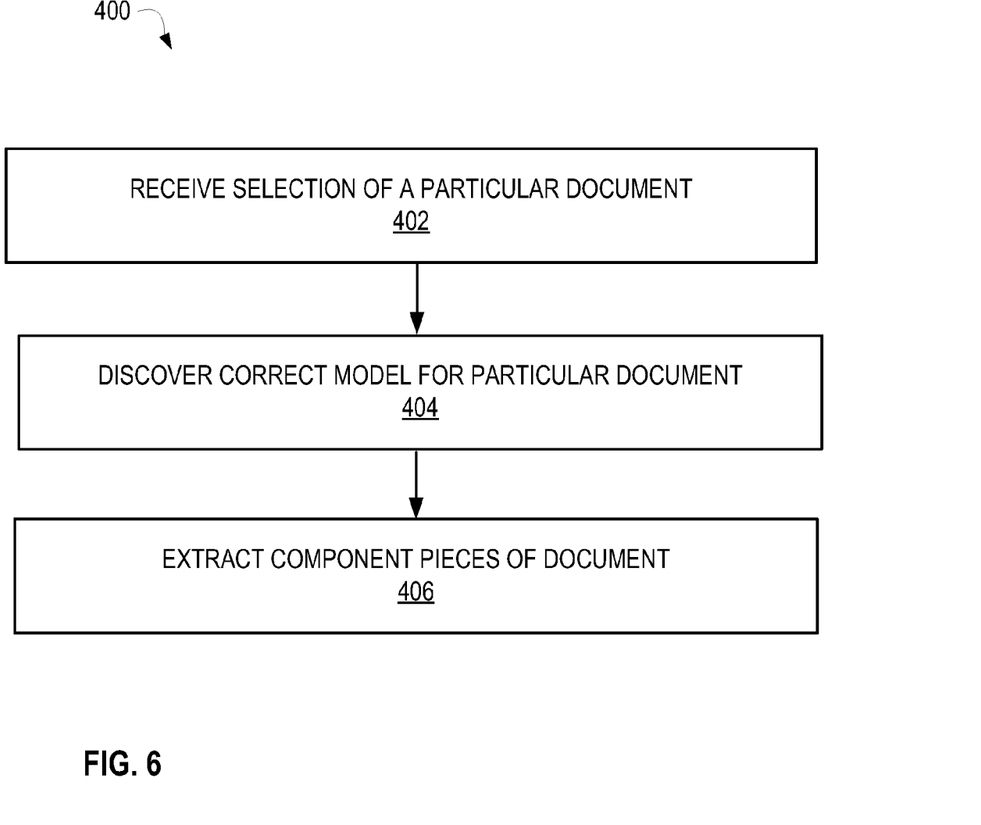
FIG. 6 is a process flow diagram for one implementation illustrating the stages involved in automatically discovering a correct model for a particular document and extracting component pieces of the document.

FIG. 6 is a process flow diagram 400 for one implementation illustrating the stages involved in automatically discovering a correct model for a particular document and extracting component pieces of the document. In other words, the system can be used to determine the likelihood that a document is a particular type. For example, "does this document look like a resume?" In order to provide an answer to such a question, a user selection is received of a particular document (stage 402) for which a document type answer is being sought. The correct model is discovered for the particular document (stage 404). Component pieces of the document are extracted (stage 406). The user's question can then be answered, such as "Yes, this document looks like a resume", or "No, this document does not look like a resume". In other implementations, a meta-model can be generated that encompasses multiple document types. In another implementation, a system is provided that automatically determines that there are multiple document types and then finds relationships between disparate documents. This would be useful, for example, to compare specs and bug reports.

Figure 7:
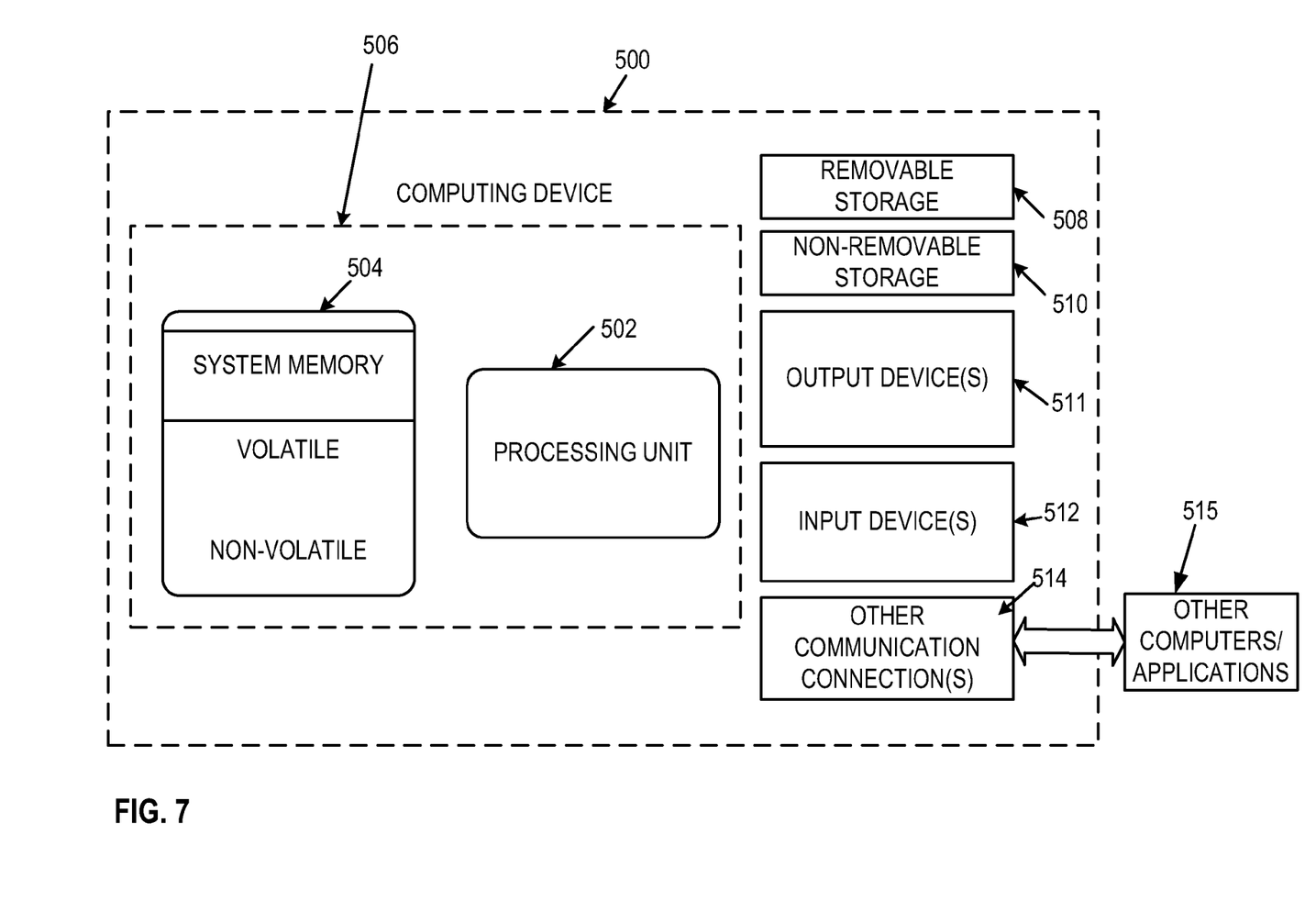
FIG. 7 is a diagrammatic view of a computer system of one implementation.

As shown in FIG. 7, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 7 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 7 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for creating a database schema from unstructured documents comprising the steps of:
    accessing an unstructured document;
    extracting information from the unstructured document using text mining, the extracted information comprising terms, phrases and sentiments;
    analyzing the extracted information to identify sections of the unstructured document;
    storing statistics regarding an occurrence of items in the unstructured document, the items comprising the extracted information and identified sections;
    repeating the accessing, extracting, analyzing, and storing steps for a plurality of unstructured documents;
    creating a probabilistic model based on the statistics stored for the plurality of unstructured documents;
    generating a database schema using the probabilistic model;
    receiving user modifications to the probabilistic model;
    updating the probabilistic model based upon the user modifications; and
    generating a database based on the database schema generated using the probabilistic model.

2. The method of claim 1, wherein the document is analyzed using machine learning techniques.

3. The method of claim 1, wherein the document is analyzed using heuristics.

4. The method of claim 1, wherein the database schema is used to map data from the document to database tables.

5. The method of claim 1, wherein the items for which statistics are stored include terms.

6. The method of claim 1, wherein the items for which statistics are stored include fields.

7. The method of claim 1, wherein the items for which statistics are stored include lists.

8. The method of claim 1, wherein the items for which statistics are stored include sections.

9. The method of claim 1, wherein the analyzing step further comprises analyzing the extracted information to identify relationships between different sections of the document.

10. The method of claim 1, wherein during the extracting step, one or more dictionaries are utilized to aid in the extracting.

11. The method of claim 1, further comprising the steps of:
    using the probabilistic model to generate analytical objects.

12. A computer storage medium having computer-executable instructions for causing a computer to perform steps comprising:
    accessing an unstructured document;
    extracting information from the unstructured document using text mining, the extracted information comprising terms, phrases and sentiments;
    analyzing the extracted information to identify sections of the unstructured document;
    storing statistics regarding an occurrence of items in the unstructured document, the items comprising the extracted information and identified sections;
    repeating the accessing, extracting, analyzing, and storing steps for a plurality of unstructured documents;
    creating a probabilistic model based on the statistics stored for the plurality of unstructured documents;
    generating a database schema using the probabilistic model;
    receiving user modifications to the probabilistic model;
    updating the probabilistic model based upon the user modifications; and
    generating a database based on the database schema generated using the probabilistic model.

13. The computer storage medium of claim 12, wherein the document is analyzed using machine learning techniques.

14. The computer storage medium of claim 12, wherein the document is analyzed using heuristics.

* * * * *